United States Patent [19]

Nakazawa

[11] 4,391,407
[45] Jul. 5, 1983

[54] VEHICLE CABIN HEATER

[75] Inventor: Sadaharu Nakazawa, Tokyo, Japan

[73] Assignee: Nissan Motor Co., Ltd., Yokohama, Japan

[21] Appl. No.: 265,843

[22] Filed: May 21, 1981

[30] Foreign Application Priority Data

May 22, 1980 [JP] Japan ............................ 55-69494[U]

[51] Int. Cl.³ .............................................. B60H 1/02
[52] U.S. Cl. ............................. 237/12.3 B; 237/2 A; 237/8 R
[58] Field of Search .................. 237/12.3 B, 2 A, 8 C, 237/8 R

[56] References Cited

FOREIGN PATENT DOCUMENTS 1154777 6/1969 United Kingdom ............ 237/12.3 B
1170342 11/1969 United Kingdom ............ 237/12.3 B

*Primary Examiner*—William R. Cline
*Assistant Examiner*—John F. McNally
*Attorney, Agent, or Firm*—Lowe, King, Price & Becker

[57] ABSTRACT

A solenoid valve is arranged in a bypass passage of an engine cooling water circuit to selectively open and close the bypass passage. A temperature sensor is arranged in a vehicle cabin heating water circuit to monitor water temperature therein. A control unit is designed so that when the temperature sensor senses that the temperature of water in the vehicle cabin heating water circuit is below a predetermined level, the solenoid valve is closed, thereby increasing the flow rate of water in the vehicle cabin heating water circuit.

4 Claims, 2 Drawing Figures

VEHICLE CABIN HEATER

BACKGROUND OF THE INVENTION

The present invention relates generally to a car heater utilizing an engine cooling water as a heat source, and more particularly to a rapid warm up vehicle cabin heater which reaches its normal operating condition in a shortened time.

BRIEF SUMMARY OF THE INVENTION

According to the present invention, there is provided a water circuit arrangement of an engine having a water jacket therein. The water circuit arrangement comprises an engine cooling circuit including a thermostat valve, a radiator and a water pump connected in series by a passage having one end connected to an outlet of the water jacket and the other end connected to an inlet of the water jacket. A bypass passage bypasses both the thermostat valve and the radiator. A vehicle cabin heating circuit includes a passage having one end connected to the outlet of the water jacket and the other end connected to the passage of the engine cooling circuit at a position just upstream of the water pump. A heater core unit is arranged in the passage of the vehicle cabin heating circuit to receive water in the passage passing through the heater core unit before reaching the water pump. Means is provided for shutting the bypass passage when the temperature of the water in the vehicle cabin heating circuit is below a predetermined level.

It is an object of the present invention to provide an improved rapid warm up vehicle cabin heater utilizing engine cooling water as a heat source.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
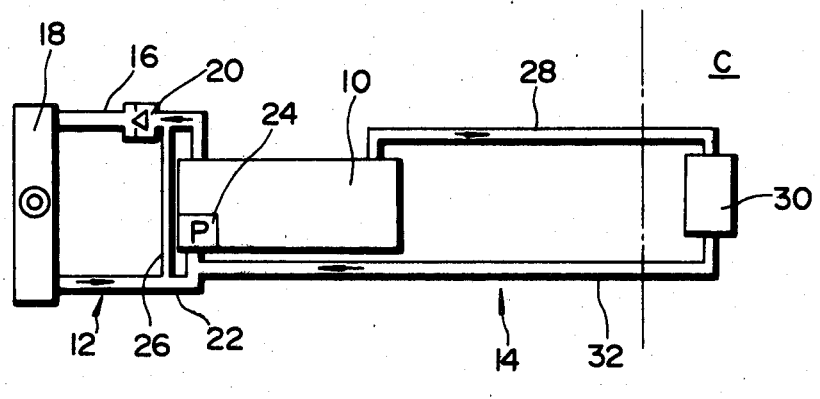
FIG. 1 is a diagrammatic illustration showing a conventional water circuit arrangement of an internal combustion engine which includes an engine cooling circuit and a vehicle cabin heating circuit.

Prior to describing in detail the invention, a conventional water circuit arrangement of an internal combustion engine will be outlined with reference to FIG. 1 in order to clarify the invention.

In the drawing, there is diagrammatically shown a conventional water circuit arrangement of an internal combustion engine 10. The circuit generally comprises an engine cooling circuit 12 and a vehicle cabin heating circuit 14.

The engine cooling circuit 12 comprises a first passage 16 connecting an outlet of a water jacket formed in the engine proper 10 to an inlet of a radiator 18. A temperature sensitive control valve or thermostat valve 20 is arranged in passage 16 and functions to close off the flow of water from engine 10 to the radiator until the engine cooling water from the engine 10 reaches a predetermined temperature level corresponding to the desired operation temperature of the engine. A second passage 22 connects an outlet of the radiator 18 to an inlet of the water jacket of the engine 10 through an engine-driven water pump 24. A third or bypass passage 26 spans between passage 16 upstream of thermostat valve 20 and the second passage 22 to bypass both the valve 20 and the radiator 18.

The vehicle cabin heating circuit 14 comprises a fourth passage 28 connecting another outlet of the water jacket of engine 10 to an inlet of a heater core unit 30 arranged in a vehicle cabin or passenger compartment C. Although not shown in the drawing, a heater fan is arranged in the unit 30 to drive air past the heater core and through ducts into vehicle cabin C. A fifth passage 32 connects an outlet of heater core unit 30 to the inlet of engine-driven water pump 24.

In operation, water pump 24 pumps engine cooling water which has been cooled by radiator 18 into the water jacket of engine 10 to cool the engine. A portion of the water thus heated in the water jacket is pumped to first passage 16 through the corresponding water jacket outlet the other part of heated water is pumped to fourth passage 28.

The water fed into first passage 16 is, when the thermostat valve 20 opens the passage pumped to radiator 18 to be cooled, permitting a part thereof to flow through bypass passage 26. The water thus cooled in radiator 18 then flows through second passage 22 for mixing with water from bypass passage 26 and finally returns to water pump 24 for continued circulation. However, as in a case of engine starting, when the temperature of water from the water jacket of engine 10 does not rise to a sufficient level to achieve the desired operating condition of engine 10, thermostat valve 20 is closed causing the entire amount of cooling water pumped through first passage 16 to flow through bypass passage 26, preventing the flow of water into radiator 18. This operation reduces the time required for raising the water temperature to the desired operating temperature.

On the other hand, the other part of heated water being pumped through fourth passage 28 is supplied to heater core unit 30 in heat exchange relationship with air blown into the vehicle cabin C to warm the cabin. The water circulating in heater core unit 30 then returns through fifth passage 32 to water pump 24 for recirculation. Although not shown in the drawing, a valve is usually mounted in the vehicle cabin heating circuit 14 for stopping the flow of water to heater core unit 30 when heating of the vehicle cabin C is unnecessary.

In the above-mentioned conventional water circuit arrangement, however, there occurs a problem when quick heating of the vehicle cabin is necessary after starting of the engine especially during cold season.

Upon requirement of such quick heating, the engine idling speed is increased by a known technique for not only shortening the time for which the engine cooling water is heated to the desired operating temperature but also increasing the flow rate of water in the vehicle cabin heating circuit 14. However, during this operation, the water flowing through bypass passage 26 also increases proportionately to the water circulating through section 14, so that heat generated by engine 10 is not effectively used for heating vehicle cabin C. Further, the increase of engine idling speed causes poor fuel consumption of engine 10.

The present invention is proposed by taking the above-mentioned problem into consideration.

Figure 2:
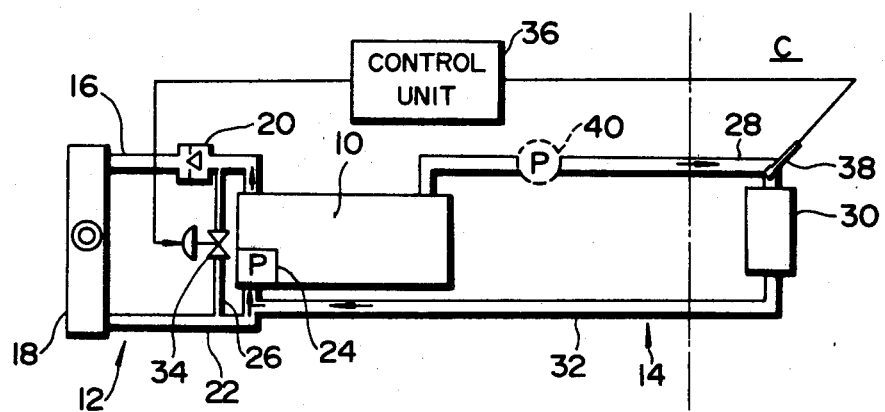
FIG. 2 is an illustration similar to FIG. 1, but shows an embodiment of the present invention.

Referring to FIG. 2, there is shown an embodiment of the present invention. Similar parts and constructions to those of FIG. 1 are designated by the same numerals and detailed explanation of them will be omitted from the following description.

As is shown in FIG. 2, in the present invention, an electromagnetically operated ON-OFF valve or solenoid valve 34 is arranged in bypass passage 26. The operation of valve 34 is controlled by a control unit 36 which receives signals emitted from a temperature sensor 38 arranged in fourth passage 28 upstream from heater core unit 30. The control unit 36 is designed so that upon receiving from the sensor 38 an information signal representing that cooling water in fourth passage 28 is lower than a predetermined level, it issues an instruction signal to close valve 34. A measure is so applied that the temperature of the water at which solenoid valve 34 closes is lower than the temperature at which thermostat valve 20 takes up its open position.

In operation, when engine 10 starts in cold surroundings, both thermostat valve 20 and solenoid valve 34 are closed thereby operating only vehicle cabin heating circuit 14. In this condition, the flow rate of water in circuit 14 increases and the time for which the water in the circuit 14 is heated to the desired operation temperature is considerably shortened as compared with a case wherein the bypass passage 26 opens. This increases the heating ability of the heater core unit 30 thereby warming vehicle cabin C in a shortened time.

If desired, an electric water pump 40 may be arranged in vehicle cabin heating circuit 14. It is to be noted that employing pump 40 promotes water circulation vehicle cabin heating circuit 14, thereby improving the heating ability of heater core unit 30.

In the above-mentioned description, it has been explained that the operation of solenoid valve 34 is commanded by temperature sensor 38 which senses the temperature of water fed into heater core unit 30. However, other types of sensors for commanding the valve 34 can also be used, such as a sensor sensing air temperature surrounding engine 10 or a temperature of engine lubricant oil in engine 10.

What is claimed is:

1. A water circuit arrangement of an engine having a water jacket therein, comprising:

an engine cooling circuit including a thermostat valve, a radiator and a water pump connected in series by means having one end connected to an outlet of said water jacket and the other end connected to an inlet of said water jacket;

a bypass passage bypassing both said thermostat valve and said radiator;

a vehicle cabin heating circuit including a passage having one end connected to the outlet of said water jacket and the other end connected to the passage of said engine cooling circuit at a position just upstream of said water pump, and a heater core unit arranged in the passage of said vehicle cabin heating circuit to receive water from the outlet of the water jacket flowing through said heater core unit before reaching said water pump;

valve means arranged in said bypass passage for selectively opening and closing said bypass passage;

temperature sensing means for measuring the temperature of water circulating through said vehicle cabin heating circuit; and control means for actuating said valve means to close the bypass passage when said temperature sensing means senses a water temperature in the vehicle cabin heating circuit below a predetermined level, and to open said bypass passage when said temperature sensing means senses a water temperature in the vehicle cabin heating circuit above the predetermined level.

2. A water circuit arrangement as claimed in claim 1 wherein said valve means includes a solenoid valve arranged in said bypass passage, and said temperature sensing means is a temperature sensor arranged in the passage of said vehicle cabin heating circuit at a position just upstream of said heater core unit.

3. A water circuit arrangement as claimed in claim 2, wherein said control means is designed to operate to close the solenoid valve when the water temperature is lower than that at which said thermostat valve takes up its open position.

4. A water circuit arrangement as claimed in claim 1, further comprising an additional water pump being arranged in said vehicle cabin heating circuit to increase water circulation in the circuit.

* * * * *